United States Patent
Brown et al.

(10) Patent No.: US 11,431,476 B2
(45) Date of Patent: Aug. 30, 2022

(54) INSTALL TIME CREATION OF FORWARD ERROR CORRECTION DATA AND INTEGRITY CHECKSUMS

(71) Applicant: DELL PRODUCTS L.P., Round Rock, TX (US)

(72) Inventors: Michael Emery Brown, Austin, TX (US); Nagendra Varma Totakura, Round Rock, TX (US); Marshal F. Savage, Austin, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 307 days.

(21) Appl. No.: 16/863,332

(22) Filed: Apr. 30, 2020

(65) Prior Publication Data

US 2021/0344480 A1    Nov. 4, 2021

(51) Int. Cl.
*H04L 9/06* (2006.01)
*H04L 9/32* (2006.01)
*H04L 1/00* (2006.01)

(52) U.S. Cl.
CPC .......... *H04L 9/0643* (2013.01); *H04L 1/0041* (2013.01); *H04L 1/0061* (2013.01); *H04L 9/3247* (2013.01); *H04L 2209/30* (2013.01)

(58) Field of Classification Search
None
See application file for complete search history.

(56) References Cited

U.S. PATENT DOCUMENTS

| | | |
|---|---|---|
| 6,711,698 B1 | 3/2004 | Sanders et al. |
| 6,832,435 B2 | 12/2004 | Sanders et al. |
| 6,892,104 B2 | 5/2005 | Patil et al. |
| 7,519,630 B2 | 4/2009 | Brown et al. |
| 8,707,297 B2 | 4/2014 | Brown et al. |
| 10,146,653 B2 | 12/2018 | Brown et al. |
| 10,353,779 B2 | 7/2019 | Sharma et al. |
| 10,361,948 B2 | 7/2019 | Ballard et al. |
| 10,387,257 B1 | 8/2019 | Brown et al. |
| 10,506,013 B1 | 12/2019 | Brown et al. |
| 10,684,666 B2 | 6/2020 | Brown et al. |
| 2001/0041947 A1 | 11/2001 | Patil et al. |
| 2002/0123918 A1 | 9/2002 | Brown et al. |
| 2003/0061382 A1 | 3/2003 | Brown et al. |
| 2003/0208902 A1 | 11/2003 | Sanders et al. |
| 2006/0136728 A1* | 6/2006 | Gentry ............... H04L 9/3242 713/160 |
| 2008/0028385 A1 | 1/2008 | Brown et al. |
| 2012/0317418 A1 | 12/2012 | Brundridge et al. |
| 2013/0007455 A1 | 1/2013 | Jaber et al. |
| 2014/0344159 A1 | 11/2014 | Savage et al. |

(Continued)

*Primary Examiner* — Otis L Thompson, Jr.
(74) *Attorney, Agent, or Firm* — Jackson Walker LLP; Christopher J. Rourk

(57) ABSTRACT

A system for transmitting data is disclosed that includes a file distribution system operating on a processor that is configured to identify one or more files for distribution to a device, forward error correction data for the one or more files, and a cryptographic key associated with the device. A Merkle tree system operating on the processor is configured to receive the forward error correction data and to generate an encrypted root hash. A data transmission system operating on the processor is configured to transmit the one or more files and the encrypted root hash to a predetermined device.

14 Claims, 1 Drawing Sheet

(56) References Cited

U.S. PATENT DOCUMENTS

| | | |
|---|---|---|
| 2015/0278524 A1 | 10/2015 | Liles et al. |
| 2016/0335421 A1 | 11/2016 | Savage |
| 2017/0085418 A1 | 3/2017 | Jose et al. |
| 2017/0317908 A1 | 11/2017 | Jose et al. |
| 2018/0063166 A1 | 3/2018 | Warden et al. |
| 2018/0077568 A1 | 3/2018 | Young et al. |
| 2018/0081776 A1 | 3/2018 | Brown et al. |
| 2018/0247059 A1 | 8/2018 | Nara et al. |
| 2018/0322012 A1 | 11/2018 | Sharma et al. |
| 2019/0258802 A1 | 8/2019 | Nara et al. |
| 2019/0288993 A1 * | 9/2019 | Lin .................... H04L 41/0668 |
| 2020/0081514 A1 | 3/2020 | Brown et al. |

\* cited by examiner

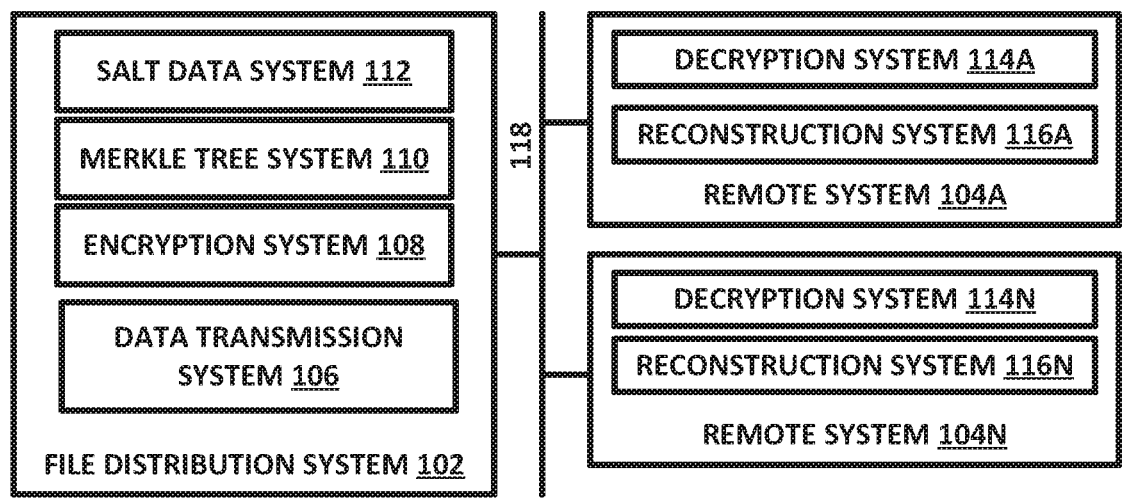
FIGURE 1    100
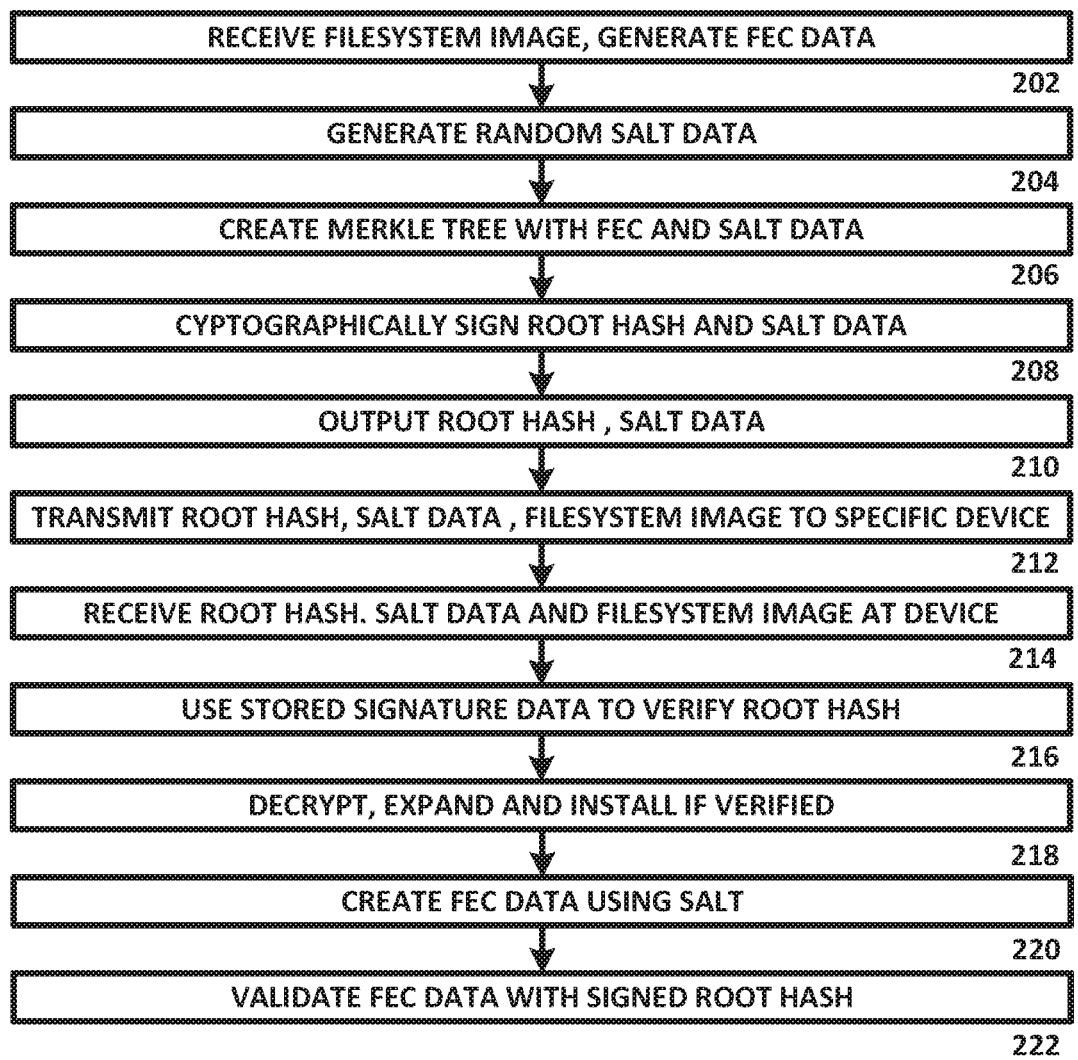
FIGURE 2    200

INSTALL TIME CREATION OF FORWARD ERROR CORRECTION DATA AND INTEGRITY CHECKSUMS

TECHNICAL FIELD

The present disclosure relates generally to data transmission, and more specifically to a system and method for install time creation of forward error correction data and integrity checksums.

BACKGROUND OF THE INVENTION

Systems for distributing software over data transmission media provide forward error correction (FEC) data that is used to verify that errors were not introduced in the data transmission process. However, such FEC data has considerable size requirements, which increases the amount of data bandwidth and storage that is required.

SUMMARY OF THE INVENTION

A system for transmitting data is disclosed that includes a file distribution system that operates on a processor, and which is configured to identify one or more files for distribution to a device, as well as FEC data for the one or more files and a cryptographic key associated with the device. A Merkle tree system operating on the processor is configured to receive the FEC data and to generate an encrypted root hash, such as by successive compression of the FEC data. A data transmission system operating on the processor is configured to transmit the one or more files and the encrypted root hash to a predetermined device.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which:

FIG. 1 is a diagram of a system for reducing the size of a distributed, customized software image, in accordance with an example embodiment of the present disclosure; and FIG. 2 is a diagram of an algorithm for reducing the size of a distributed, customized software image, in accordance with an example embodiment of the present disclosure.

DETAILED DESCRIPTION OF THE INVENTION

In the description that follows, like parts are marked throughout the specification and drawings with the same reference numerals. The drawing figures may be to scale and certain components can be shown in generalized or schematic form and identified by commercial designations in the interest of clarity and conciseness.

Embedded management components, such as for remote access control and enclosure control, can use FEC to generate Reed Solomon error correction codes for the firmware image. The FEC data can be generated at the time the image is created, and can be included as part of the update package that is distributed to users.

The FEC data can be used by the firmware to correct any read errors on the underlying flash storage device at runtime. One issue with this FEC data is that it is relatively uncompressible, and it increases the size of the user download for the firmware upgrade. The FEC data also increases the size requirements on the device to hold the firmware upgrade while it is in progress.

Another corollary to this is that the size of the FEC data can be increased to allow correction of larger read errors. However, the importance of reducing firmware update package size also favors keeping the amount of data stored in this space to a minimum, which reduces the size of errors that can be corrected.

The present disclosure delays generating the FEC data at image build time, until the point at which the image is being installed onto the device. The image that is being installed already has cryptographic checksums that can be used to ensure the image integrity. At the point where the image is installed, it is safe to check the image integrity using the cryptographic signature and to then generate the FEC data.

One advantage of the present disclosure is that the firmware can be optimized for the largest FEC data set that will fit in the free space on the device while at the same time avoiding bloat in the firmware update package. The generation of FEC data at runtime allows reserved extra space in the firmware partition to be used to store the FEC data. In one example embodiment, approximately 100 MB of error correction data can be generated for approximately 140 MB of firmware image, which provides for correction of massive amounts of data corruption. In another example embodiment, where there is less space available, more than twice the default amount of FEC data can be generated and used to detect and correct more errors than default. A prototype of FEC data generated using the present disclosure included about 1 MB of FEC data for 135 MB of firmware image, allowing correction of up to 8 MB of errors. If the size is increased to 100 MB of FEC data, recovery from a major problem that affects most of a software update is possible.

The write block size can be configured when the FEC data is generated during updates to match the block size of the hardware, such as to match the "erase block" size of the underlying flash memory device. This matching enables multiple commodity parts to be sourced while still configuring the FEC data to be optimized for specific parts, instead of build time averaging to support all parts with the same image. In one example embodiment, this matching can save approximately 10-100 MB of the firmware update package size.

In another embodiment, a Linux DMVerity kernel subsystem can be used that includes a Merkel tree of hashes to perform runtime verification of the data as it is read from the device. This process can be used in addition to and distinct from the FEC data. The "hash tree" data can also or alternatively be generated at install time as well, to further optimize a duplicate operation (DUP) and the firmware image package size.

In another example embodiment, the use of FEC on the firmware image can be implemented using a Linux "verity-setup" tool, which is a userspace utility that is part of the "cryptsetup" package, and which provides for generation of FEC data at build time and packaging the FEC data into the distributed firmware update package. When used with "dm-verity," FEC data can be included as a file in the output of the "veritysetup:" command.

While it is known in some applications to generate files at software build time and to include those files in the customer downloaded firmware update file, the present disclosure modifies this process to reduce the data storage requirements and to augment security, which has not been recognized in the prior art for this process. For example, if the build time process is:
INPUT: "my-root-filesystem.squashfs"
COMMAND: "veritysetup . . . . $INPUT"
OUTPUT: set of files:
  a. FILE: "hash-tree.data"
  b. FILE: "FEC.data"
  c. STRING: "$root_hash_string"
then it is possible to not ship both of the output files "a" and "b" as part of the firmware update package, but to instead re-generate these files at install time. In one example embodiment, the $root_hash_string can be saved, and the veritysetup command can be updated to use the saved $root_hash_string as input, along with the INPUT files, to generate the output files at install time on the customer's device, while at the same time ensuring cryptographic integrity of the downloaded files by using the existing digital signatures as well as the $root_hash_string. The disclosed process reduces the size of the FEC data and the hash-tree data files, which is significant, and which can result in a ~20% smaller download size or more. The veritysetup open source tool can be modified in accordance with the present disclosure and used to generate the hash tree and FEC data. The veritysetup tool is used during build time to generate these files.

The dmverity code can utilize a Merkle tree of hashes, such as where a 1 MB data file is divided up into a total of 256 individual 4 KB sub-units. Each sub-unit can be hashed, which can be referred to as a level 1 hash. In this example embodiment, the level 1 hash could be 32 bytes, which means that the total amount of level 1 hash data would be 256*32 bytes=8 KB. The process could be repeated to generate a level 2 hash, with 2×4 KB blocks to hash, which results in 64 bytes of level 2 hash data.

Because this process is deterministic and will always yield the same values, a pre-determined number of random bytes can be added to one or more hash level, to make the output less deterministic. The pre-determined number of random bytes can be referred to as "salt."

This modified process can be implemented at runtime by saving the salt bytes during the build process, generating the hash tree (which can ultimately be discarded), and obtaining the final root hash. The root hash and the salt data that was used in the image can be saved and provided to the user. If the root hash 32-bytes and the salt data is 32-bytes or less, this is significantly smaller than the tens of MB of hash tree data and FEC data that would typically be provided.

In order to use the veritysetup code, it can be modified to process the salt as an input for use in generating the hash tree data and FEC data. This process can happen locally when an upgrade is initiated, where the hash tree data and FEC data is generated on the user device as part of the upgrade process.

The present disclosure can be implemented without a key server, such as where a currently running version of firmware has an embedded public certificate that is used to verify any future upgrade packages. Any upgrade can be required to be signed by the private certificate corresponding to the loaded public certificate, which can be used in the infrastructure to build firmware packages.

In another example embodiment, the input to the firmware update package can be structured in the following manner:
INPUTS
  <filesystem image>
  <veritysetup randomly generated SALT>
  Processed by: "veritysetup" tool
OUTPUTS:
  <filesystem image—unchanged>
  <ROOT HASH>—small string consisting of SALT+cryptographic hash of the hash tree (Normally, "SALT" is generated randomly every time you invoke veritysetup)
  <HASH TREE>—large file with checksums for each data block, then checksums of itself
  <FEC DATA>—large file with the forward error correction data As part of the firmware build, the boot data, which includes the ROOT HASH data, can be cryptographically signed, to ensure that whatever the system boots to has to exactly match that ROOT HASH. Only the ROOT HASH data and filesystem image need to be shipped as part of the firmware update binary that the customer downloads, because the ROOT HASH data can be used to recreate the HASH TREE data and FEC data.

The present disclosure can include creating a firmware download that includes the filesystem image and ROOT HASH data (which has the salt+hash), which can avoid the need to include the larger HASH TREE data and FEC data. Transmission of the generated HASH TREE data and FEC data can be avoided, which substantially reduces the download data size. Upon install, the SALT data can be extracted from the ROOT HASH data, and used by veritysetup or other suitable tools as an input. In this manner, the default veritysetup process is not needed to generate the random SALT data. By adding the SALT data as an input, the rest of the processing can stay the same, and the bitwise identical HASH TREE data and FEC data can be regenerated using the input data+SALT data.

FIG. 1 is a diagram of a system 100 for reducing the size of a distributed, customized software image, in accordance with an example embodiment of the present disclosure. System 100 includes file distribution system 102, which includes distribution system 106, encryption system 108, Merkle tree system, 110 and salt data system 112, which is coupled over network 118 to remote systems 104A through 104N, which include decryption systems 114A through 114N and reconstruction systems 116A through 116N, respectively, each of which can be implemented in hardware or a suitable combination of hardware and software.

File distribution system 102 can include one or more algorithms configured to be installed onto a processor and which cause the processor to identify a software image for distribution to a remote system, to prepare the software image to be distributed to the remote node and to transmit the prepared software image. In one example embodiment, the prepared software image can be reduced in size by transmitting a Merkel tree root hash that has been encrypted and which contains error correction data, such as a Merkle tree of FEC data or other suitable data.

Distribution system 106 can include one or more algorithms configured to be installed onto a processor and which cause the processor to identify an address for distribution of a software update package that includes a software image and an associated root hash. In one example embodiment, distribution system 106 can use a log of remote systems 104A through 104N and can determine whether an operating system or other suitable software code needs to be updated. Distribution system 106 can interact with encryption system 108, Merkle tree system 110 and salt data system 112 to create a unique software update package that is to be distributed to an individual device.

Encryption system 108 can include one or more algorithms configured to be installed onto a processor and which cause the processor to identify an encryption key for a remote system 104A through 104N, and to use the encryption key to encrypt a root hash and associated salt data or other suitable data.

Merkle tree system 110 can include one or more algorithms configured to be installed onto a processor and which cause the processor to generate a root hash from a software image. In one example embodiment, the root hash can have a predetermined data structure, such as block sizes and number of layers, the data structure can be selected based on the software image data or remote system that the software image is being transmitted to, or other suitable functions can also or alternatively be used.

Salt data system 112 can include one or more algorithms configured to be installed onto a processor and which cause the processor to generate random data for use in preparing a Merkle tree. In one example embodiment, Merkle tree processing can result in a deterministic output, and the use of salt data to modify the Merkle tree data can create an output that cannot be readily interpreted. Salt data system 112 can generate a predetermined number of random data fields to allow the Merkle tree processing to be modified so as to prevent decoding of the encoded root hash, or for other suitable applications.

Remote systems 104A through 104N can include one or more algorithms configured to be installed onto a processor and which cause the processor to perform data processing. In one example embodiment, remote systems 104A through 104N can be general purpose processors, special purpose processors or other suitable devices that utilize software that includes one or more algorithms that are stored in a data memory and loaded onto a processor for specific functions. Remote systems 104A through 104N can periodically receive and install software updates for such software, and can include separate data receiver systems (such as network interface cards and data caches) software installation systems that are adapted for use with the present disclosure.

Decryption systems 114A through 114N can include one or more algorithms configured to be installed onto a processor and which cause the processor to decrypt data that is received from a predetermined source. In one example embodiment, decryption systems 114A through 114N can each be associated with unique decryption keys, where the specific decryption key that is to be used to decrypt data that is received from a source depends on the specific decryption system 114A through 114N that receives the data and the source of the data.

Reconstruction systems 116A through 116N can include one or more algorithms configured to be installed onto a processor and which cause the processor to reconstruct error correction data, a Merkle tree and other suitable data that can be used to perform error correction processing of a software image. In one example embodiment, the software image can encounter one or more errors in the encoding process, data transmission process, data reception process, data storage and retrieval process or other processes, and reconstruction systems 116A through 116N can reconstruct error correction data from hash data that includes a Merkle tree and salt data, for use in error correction processing.

Network 118 can include one or more devices that utilize algorithms to transfer data between end points. In one example embodiment, network 118 can be a virtual private network or other suitable systems. The algorithm then proceeds to 120.

At 120, the FEC data is created using the salt data. In one example embodiment, the FEC data can be created by reversing the Merkle tree process, by using the salt data to reconstruct the layers of the Merkle tree until a final set of FEC data has been created, or in other suitable manners. The algorithm then proceeds to 122.

At 122, the FEC data is validated with the signed root hash. The process can then terminate or continue to another process, such as installing the update.

In operation, system 100 allows a different software image for each of a plurality of remote systems 104A through 104N to be identified, processed and distributed to the associated remote system 104A through 104N, with suitable data reduction and encryption processing to protect the data from hostile attacks, to reduce the amount of data that is to be transmitted and for other suitable purposes. System 100 thus improves the function of file distribution system 100 and remote systems 104A through 104N, by decreasing the amount of data that needs to transmitted and stored, and also reduces the amount of data traffic on network 118.

FIG. 2 is a diagram of an algorithm 200 for reducing the size of a distributed, customized software image, in accordance with an example embodiment of the present disclosure. Algorithm 200 can be implemented in hardware or a suitable combination of hardware and software.

Algorithm 200 begins at 202, where a file system image is received and FEC data is generated. In one example embodiment, updates can be identified for specific processors on specific devices, such as from an update log, and the software image associated with the update can be provided to a system that operates in a processor that is executing one or more algorithms that are configured to prepare the software image for distribution. The FEC data can be generated by Reed Solomon error correction code processing at the time the file system image is created or at other suitable times. The algorithm then proceeds to 204.

At 204, random salt data is generated. In one example embodiment, the random salt data can have a predetermined format, to allow it to be used in combination with a Merkle tree having predetermined field sizes and numbers of fields. The algorithm then proceeds to 206.

At 206, a Merkle tree is created with the FEC data and the random salt data. In one example embodiment, the Merkle tree can include a number of layers, and the random salt data can be added to predetermined data fields in each layer to modify the data that is generated in the next layer of the Merkle tree, such as to prevent a malicious third party from determining the process for generating the Merkle tree, the FEC data encoded in the Merkle tree or other data related to the file system image and FEC data. The algorithm then proceeds to 208.

At 208, the root hash and salt data is cryptographically signed. In one example embodiment, the root hash and salt data can be combined into a single file or other suitable data structures and can be signed using a stored cryptographic key that is associated with the device that is to receive the software update. Alternatively, the root hash and salt data can be separate files or data structures, can be included in other suitable data structures or other suitable processes can also or alternatively be used. The algorithm then proceeds to 210.

At 210, the cryptographically signed root hash data and salt data is output. In one example embodiment, the cryptographically signed root hash data and salt data can be stored in a data file or register associated with the software image that is to be distributed, an address for the signed root hash data and salt data can be stored or other suitable processes can be used. The algorithm then proceeds to 212.

At 212, the signed root hash data, salt data and file system image is transmitted to a specific device. In one example embodiment, the specific device can request a software update and the signed root hash data, salt data and file system image can be transmitted in response. In another example embodiment, the specific device can be polled to receive the software update and the signed root hash data, salt data and file system image can be transmitted in response, or other suitable processes can be used. The algorithm then proceeds to 214.

At 214, the signed root hash data, salt data and file system image is received at the device. In one example embodiment, the device can receive and store the signed root hash data, salt data and file system image in response to one or more control commands, or other suitable processes can be used. The algorithm then proceeds to 216.

At 216, stored signature data is used to verify the encrypted root hash and salt data. In one example embodiment, the stored signature data can be applied to the encrypted root hash and salt data, and it can be determined whether the decrypted data has predetermined data format characteristics or contents. If it is determined that the encrypted root hash and salt data cannot be decrypted using the stored signature data, an error message can be generated and other suitable procedures can be used to determine the source of the error. Otherwise, the algorithm proceeds to 218.

At 218, the data and software image is decrypted, expanded and installed. In one example embodiment, the root hash can be expanded to create the FEC data, which can be used to verify the software image and to correct any errors. The algorithm then proceeds to 220, where the FEC data is created using the salt. The algorithm then proceeds to 222 where the FEC data with the signed root hash is validated. The algorithm then terminates.

In operation, algorithm 200 can be used to reduce a size of a distributed, customized software image, to reduce data transmission requirements and for other suitable purposes. Although algorithm 200 is shown in flow chart format, a person of skill in the art will recognize that the functions of algorithm 200 can also or alternatively be implemented using object-oriented programming, state diagrams, ladder diagrams or in other suitable manners.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. A software system is typically created as an algorithmic source code by a human programmer, and the source code algorithm is then compiled into a machine language algorithm with the source code algorithm functions, and linked to the specific input/output devices, dynamic link libraries and other specific hardware and software components of a processor, which converts the processor from a general purpose processor into a specific purpose processor. This well-known process for implementing an algorithm using a processor should require no explanation for one of even rudimentary skill in the art. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. A system can receive one or more data inputs, such as data fields, user-entered data, control data in response to a user prompt or other suitable data, and can determine an action to take based on an algorithm, such as to proceed to a next algorithmic step if data is received, to repeat a prompt if data is not received, to perform a mathematical operation on two data fields, to sort or display data fields or to perform other suitable well-known algorithmic functions. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A system for transmitting data, comprising:
   a file distribution system operating on a processor and configured to identify one or more files for distribution to a device, forward error correction data for the one or more files, and a cryptographic key associated with the device;
   a Merkle tree system operating on the processor and configured to receive the forward error correction data and to generate an encrypted root hash; and
   a data transmission system operating on the processor and configured to transmit the one or more files and the encrypted root hash to a predetermined device.

2. The system of claim 1 wherein the Merkle tree system is configured to generate the encrypted root hash using salt data.

3. The system of claim 1 wherein the Merkle tree system is configured to generate the encrypted root hash using salt data at predetermined data fields and predetermined layers of a Merkle tree.

4. The system of claim 1 wherein the data transmission system is configured to compress the one or more files and the encrypted root hash prior to transmitting the compressed one or more files and encrypted root hash.

5. The system of claim 1 wherein the data transmission system is configured to sign the one or more files and the encrypted root hash with a private encryption key prior to transmitting the signed one or more files and encrypted root hash.

6. The system of claim 1 wherein the data transmission system is configured to compress the one or more files and the encrypted root hash and to sign the compressed one or more files and encrypted root hash with a private encryption key prior to transmitting the compressed one or more files and encrypted root hash.

7. The system of claim 1 wherein the forward error correction data for the one or more files is discarded after the root hash is generated.

8. A system for transmitting data, comprising:
   a data receiver system operating on a processor and configured to receive one or more files and an encrypted root hash at a predetermined device;
   a reconstruction system operating on the processor and configured to generate forward error correction data using the encrypted root hash; and
   a file installation system operating on the processor and configured to decrypt the encrypted root hash, to generate forward error correction data using the encrypted root hash and to apply the forward error correction data to the one or more files.

9. The system of claim 8 wherein the reconstruction system is configured to generate the forward error correction data using salt data.

10. The system of claim 8 wherein the reconstruction system is configured to generate the forward error correction data using salt data at predetermined data fields and predetermined layers of a Merkle tree.

11. The system of claim 8 wherein the data receiver system is configured to decompress the one or more files and the encrypted root hash.

12. The system of claim 8 wherein the data receiver system is configured to sign the one or more files and the encrypted root hash with a public encryption key after receiving the signed one or more files and encrypted root hash.

13. The system of claim 8 wherein the data receiver system is configured to decompress the one or more files and the encrypted root hash and to sign the decompressed one or more files and encrypted root hash with a public encryption key.

14. The system of claim 8 wherein the reconstruction system is configured to determine a size of the forward error correction data to generate as a function of an amount of available data storage space.

* * * * *